united States Patent [19]
Strepparola et al.

[11] Patent Number: 4,894,418
[45] Date of Patent: Jan. 16, 1990

[54] VULCANIZABLE COMPOSITIONS OF FLUOROELASTOMERS HAVING IMPROVED CHARACTERISTICS OF PROCESSABILITY AND OF CHEMICAL STABILITY

[75] Inventors: Ezio Strepparola, Treviglio; Giovanni Moggi, Milan; Cinzia Di Fede, Casciago; Gianna Cirillo, Genoa, all of Italy

[73] Assignee: Ausimont S.p.A., Milan, Italy

[21] Appl. No.: 300,200

[22] Filed: Jan. 23, 1989

Related U.S. Application Data

[63] Continuation of Ser. No. 928,407, Nov. 10, 1986, abandoned.

[30] Foreign Application Priority Data

Nov. 15, 1985 [IT] Italy .............................. 22865 A/85

[51] Int. Cl.$^4$ .......................... C08J 3/18; C08L 27/16; C08L 27/18; C08L 27/20
[52] U.S. Cl. ................................. 525/185; 525/326.3; 525/326.2

[58] Field of Search .................. 525/185, 326.2, 326.3, 525/376; 526/377

[56] References Cited

U.S. PATENT DOCUMENTS

| 3,564,059 | 2/1971 | Sianesi et al. | 524/377 |
| 3,933,732 | 1/1976 | Schmiegel | 525/326.3 |
| 4,250,278 | 2/1981 | Suzuki et al. | 525/326.3 |
| 4,487,903 | 12/1984 | Tatemoto et al. | 525/326.3 |
| 4,489,196 | 12/1984 | Schmiegel | 525/326.3 |
| 4,501,858 | 2/1985 | Moggi | 525/326.3 |

*Primary Examiner*—Allan M. Lieberman
*Attorney, Agent, or Firm*—Stevens, Davis, Miller & Mosher

[57] ABSTRACT

Vulcanizable compositions of fluoroelastomers based on vinylidene fluoride with one or more monomers containing an ethylene unsaturation and at least one fluorine atom, having improved processability and improved chemical stability, and comprising, as a processing coadjuvant, a mono- or dihydroxypolyfluoroether having a means molecular weight higher than or equal to 400 for the monohydroxypolyfluoroethers and higher than or equal to 2500 for the dihydroxypolyfluoroethers.

10 Claims, No Drawings

VULCANIZABLE COMPOSITIONS OF FLUOROELASTOMERS HAVING IMPROVED CHARACTERISTICS OF PROCESSABILITY AND OF CHEMICAL STABILITY

This application is a continuation of application Ser. No. 928,407, filed Nov. 10, 1986, now abandoned.

THE INVENTION

The present invention relates to a new processing coadjuvants for improving the processability and the chemical stability of vulcanizable compositions of fluorelastomers.

In particular, the invention relates to the use of plasticizers of the class of mono- and di-hydroxypolyfluoroethers in vulcanizable compositions of fluoroelastomers based on vinylidene fluoride.

The vulcanized elastomers based on vinylidene fluoride copolymers, in which vinylidene fluoride is copolymerized with one or more monomers containing an ethylene unsaturation and at least one fluorine atom, are well known and are widely utilized in a plurality of applicative sectors, where an exceptional chemical stability towards solvents, lubricants, fuels, acids, and analogous products is required.

The vulcanized articles obtained from such elastomeric polymers are most suitably utilized as sealing gaskets in general, in both static and dynamic conditions, in the automotive, aeronautic, missile, naval, mechanical, chemical sectors, in the protective impermeabilizations of various supports, such as protective clothes for contact with chemically aggressive agents.

According to the most advanced prior art, the vulcanizable compositions of fluoroelastomers based on vinylidene fluoride comprise:

(A) a copolymer of vinylidene fluoride with at least one other fluorinated monomer containing an ethylene unsaturation;

(B) a vulcanization accelerator selected from the following: quaternary ammonium salts, quaternary phosphonium salts, phosphoranamine-derivatives;

(C) one or more basic acceptors (basic agents which are acceptors of acids), such as e.g. MgO and Ca(OH)$_2$; and (D) a polyhydroxylated cross-linking agent.

Examples of these compositions are described in patents GB 1,356,344; U.S. Pat. No. 3,876,654 and U.S. Pat. No. 4,259,463.

Within the field of development of the fluorinated elastomers, well defined requirements have recently acquired importance, namely the simultaneous achievement of the following aims:

1. A general improvement of the rheological and processability characteristics of the mixtures.

2. A decrease in the hardness of the mixtures (with respect to the value of Shore hardness A-75 reported by Kirk-Othmer, III Ed. (1980), Vol. 8, page 509, as typical values for a fluoroelastomer).

3. The possibility of easily extruding articles having a complicated profile and also of considerable size.

4. The attainment of vulcanized articles having improved properties of chemical stability with respect to methanol and fluid lubricants.

5. The improvement of the properties at low temperatures, without affecting the thermal stability at high temperatures.

It is well known to use processing coadjuvants in consquence of the poor extrudability characteristics of the mixtures and of the phenomena of adhesion to the molds and of soiling of same.

The processing coadjuvants are products having plasticizing properties, such as e.g., vegetable waxes, low molecular weight polyethylenes, stearates, polyesters, and the like.

By using such plasticizers one may achieve the aims 1 through 3 mentioned hereinbefore. However, said plasticizers of the prior art give rise to various drawbacks such as a worsening of the elastic characteristics, lower heat stability, high compression set values.

It has now, surprisingly, been found that the use of the additives of the present invention permits one to achieve all the aims from 1 to 5.

Thus, it is the object of the present invention to provide additives of the classes of mono- and di-hydroxypolyfluoroethers comprising fluoropolyoxyalkylene repeating units selected from the classes of units indicated hereinbelow:

Class of mono-hydroxypolyfluoroethers fluoropolyethers having a molecular weight ranging from 400 to 10,000.

(1) $(C_3F_6O)$ $(CFXO)$ $X = -F$ or $-CF_3$; said units being statistically distributed along the polyfluoroether chain;

(2) $(C_3F_6O)$;

(3) $(CH_2CF_2CF_2O)$.

Class of di-hydroxypolyfluoroethers fluoropolyethers having a molecular weight from 2,500 to 10,000.

(4) $(C_2F_4O)$, $(CF_2O)$, said units being statistically distributed along the fluoropolyoxyalkylene chain;

(5) $(C_3F_6O)$, $(C_2F_4O)$, $(CFXO)$ where $X = -F$ or $-CF_3$, said units being statistically distributed along the fluoropolyoxyalkylene chain;

(6) $(CH_2-CF_2-CF_2-O)$, said units being linked to one another, inside the fluoropolyoxyalkylene chain, in the following manner: $-(O-CF_2-CF_2-CH_2-)_p-O-R_f-O-(CH_2-CF_2-CF_2-O)_q-$ where $R_f$ is a fluoroalkylene group, preferably containing from one to eight carbon atoms, and p and q are integers where $P+q=9$ to 38;

(7)

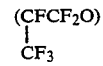

said units being linked to each other, inside the fluoropolyoxalkylene chain, in the following manner:

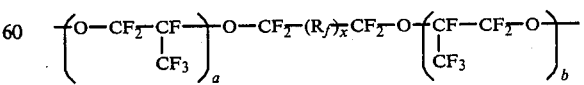

where $R_f$ is a fluoroalkylene group, preferably containing from one to eight carbon atoms, x is 0 or 1, and a and b are integers where $a+b=12$ to 50.

The hydroxylated compounds of the indicated classes may also be used in admixture with one another.

Monohydroxypolyfluoroethers of class (1) are selected in particular from those having the following formula:

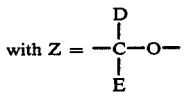

and where the radicals D and E are equal to or different from each other and are selected from H, —CH$_3$ and —CF$_3$, X=—F or —CF$_3$, and m and n are positive integers such that the M'/n' ratio ranges from 1 to 20 m'=1 to 40 and n'=1 to 40.

These compounds are preparable by means of the process described in U.S. Pat. No. 3,513,203, or in U.S. Pat. No. 3,847,978, wherein the end group —COF is converted into group —OH according to U.S. Pat. No. 3,810,174.

Monohydroxypolyfluoroethers of Class (2) are selected in particular from those having the following formula:

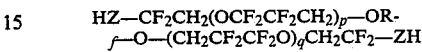

wherein r' is an integer from 1 to 45; Z being the same as defined before. These products are described in U.S. Pat. No. 3,242,218, wherein the group —COF is converted in order to obtain the end group —OH, as is described in U.S. Pat. Nos. 3,847,978 and 3,810,874.

Monohydroxypolyfluoroethers of class (3) are selected in particular from those having the following formula:

$$F(CH_2CF_2CF_2O)_{s'}—CH_2 CF_2—Z-H$$

where s' is an integer where s'=2 to 50, and Z is the same as defined above. These products are described in European patent application No. 148,482, in which the group —COF is converted in order to obtain the end group —OH, as is described in U.S. Pat. Nos. 3,847,978 and 3,810,874.

Fluoropolyoxyalkylene diols belonging to class (4) are selected in particular from those having the following formula:

$$HZ—CF_2O (C_2F_4))_m(CF_2O)_nCF_2—ZH$$

wherein Z is the same as defined before, m and n are integers and m/n is between 0.5 and 1.5 where m+ =24 to 100, with the oxyfluoroalkylene units being statistically distributed along the chain. These compounds can be prepared, for example, according to the methods described in U.S. Pat. No. 3,810,874.

Fluorinated diols belonging to class (5) are selected in particular from the compounds representable by the following formula:

$$HZ—CF_2—(C_3F_6O)_r(C_2F_4O)_s(CFXO)_t—CF_2—ZH$$

wherein X is —F or —CF$_3$, r, s, t are integers where r=2 to 8, s=10 to 40, and t=10 to 40, and Z is the same as defined hereinbefore.

Such compounds are obtainable by photo-oxidation of mixtures of C$_3$F$_6$ and C$_2$F$_4$, as is described in U.S. Pat. No. 3,665,041, and by subsequent conversion of end groups —COF into groups containing end groups —OH, said conversion being accomplished according to the known methods described in U.S. Pat. Nos. 3,847,978 and 3,810,874.

Fluorinated diols belonging to class (6) are selected in particular from the compounds having the formula:

$$HZ—CF_2CH_2(OCF_2CF_2CH_2)_p—OR_f—O—(CH_2CF_2CF_2O)_qCH_2CF_2—ZH$$

wherein Z and R$_f$ are the same as defined hereinbefore, and p and q are integers. They are described in European patent application EP 148,482, wherein end groups —COF may be converted in order to get end groups —OH as is described in U.S. Pat. Nos. 3,847,978 and 3,810,874.

Fluorinated diols belonging to class (7) are selected in particular from the compounds having the formula:

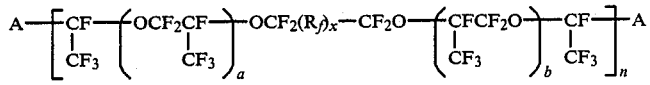

wherein A is a group comprising end group —OH, for example —CH$_{2;l}$ OH, n is an integer equal to or higher than 1, and a and b are integers.

Such compounds are described in European patent application EP 151,877.

The fluoroelastomers constituting component (A) are generally copolymers of vinylidene fluoride with hexafluoropropene, optionally containing tetrafluoroethylene.

Instead of hexafluoropropene it is possible to utilize chlorotrifluoroethylene, 1-hydropentafluoropropene, 2-hydropentafluoropropene.

Also mixtures of the above-cited comonomers are utilizable.

The tetrafluoroethylene and/or hexafluoropropene units in the copolymers can be substituted in part or in whole by perfluoroalkylvinylethers.

Generally, the amount of perfluoroalkylvinylether ranges from 0.5 to 15% by moles based on the copolymer total amount, and preferably it is lower than 5% by moles.

Also other fluorinated monomers are useful as comonomers, provided they contain a double bond of the ethylene type and at least one fluorine atom.

Compounds (A) are preparable as is described in the literature (e.g., Kirk Othmer, Encyclopaedia of Chemical Technology, Vol. 8, page 500 and following, 1979), by operating preferably in an aqueous emulsion and optionally in the presence of chain transfer agents such as those described in U.S. Pat. No. 4,000,356.

Preferred in particular are the copolymers in which vinylidene fluoride ranges from 40% to 85% by moles, perfluoropropene ranges from 15% to 30% by moles, and tetrafluoroethylene ranges from 0 to 30% by moles.

Accelerator (B) belongs to the previously cited classes, the preferred compounds being the following:

among the quaternary ammonium salts: methyltrioctylammonium chloride, laurylpyridinium bromide, benzyltrioctylammonium chloride;

among the quaternary phosphonium salts: benzyltriphenylphosphonium chloride, benzyltriphenylphosphonium tetrafluoroborate, methyltrioctylphosphonium acetate, carbethoxymethyl-triphenylphosphonium bromide;

among the phosphoranamine derivtives or aminophosphonium compounds:
1-chloro, 1-benzyl, 1-diphenylN(diethyl)-phosphoranamine 1-tetrafluoroborate, 1-benzyl,N,N',N''(hexamethyl)phosphorantriamine, 1-bromo, 1-benzyl, 1-phenylN,N'(tetraethyl)phosphorandiamine.

Compound (C) is an inorganic compound such as for example an oxide of a divalent metal, e.g., ZnO, MgO, PbO, CaO, or a mixture of oxide and hydroxide of said metals or salts of weak acids, as is described in U.S. Pat. No. 3,876,654.

Compound (D) is a polyhydroxylated compound known as a vulcanizing agent for fluoroelastomers. There may be cited: hydroquinone, resorcinol, 2,2'-bis(p. hydroxyphenyl)-hexafluoropropane known as bisphenol AF, 2,2'-bis(p. hydroxyphenyl)-propane known as bisphenol A. Examples of these compounds are reported in U.S. Pat. No. 3,876,654.

Generally, for 100 parts by weight of an elastomeric copolymer of vinylidene fluoride (A) with one or more fluorinated monomers as indicated hereinabove there are used:

from 1 to 40 parts by weight of basic acceptor (C), consisting of one or more basic oxides of divalent metals, as indicated above, optionally in the form of cationic complexes or chelates, optionally in the presence of 0–10 parts by weight of one or more basic compounds selected from the group consisting of calcium, strontium and barium hydroxides, the metal salts of weak acids such as carbonates, benzoates and phosphates of calcium, strontium, barium, sodium and potassium, optionally in the form of complexes with the usual cationic chelants or complexing agents of a type well known to those skilled n the art;

from 0.5 to 15 parts by weight of coadjuvant mono- or di-hydroxypolyfluoroether;

from 0.2 to 4 parts by weight of a vulcanization accelerator (B) selected from those of the classes described hereinbefore; and from 0.3 to 6 parts by weight of compound (D).

The vulcanizable compositions of the above-indicated type are vulcanized through a process which consists in heating said compositions at first under pressure, at temperatures from 130° to 230° C., preferably from 160° to 200° C., for a time from 0.5 to 60 minutes and preferably from 1 to 20 minutes; the articles so obtained being then post-vulcanized in an oven or in a furnace, at atmospheric pressure, at temperatures between 130° to 315° C., preferably between 200° and 275° C., for a time from 5 to 48 hours, and preferably from 10 to 24 hours.

A further object of the invention consists in that the coadjuvant according to this invention can be also additioned with small amounts (0.5–4 parts) of polyfluoroethers not containing functional groups corresponding to the classes indicated above for the mono- and di-hydroxypolyfluoroethers.

Actually, it has been found that said compounds not containing functional groups are compatible with the compositions of the present invention, while they would not be such in the absence of the coadjuvant of the invention, which indeed would lead to undesired blooming phenomena.

The better results obtainable by means of the coadjuvants of the present invention in contrast to those known in the art are due to the fact that during the vulcanization process a chemical reaction between the monohydroxylated or dihydroxylated fluoropolyether of this invention and the elastomeric chain takes place. Thereby the coadjuvant does not bloom or migrate during the vulcanization and post-vulcanization steps.

In fact, extraction tests with 1,1,2-trichloro-1,1,2-trifluoroethane (F 113) at 40° C. on the mixture before the vulcanization step permit one to recover the hydroxylated fluoropolyether in a nearly quantitative manner. Identical extraction tests conducted on the vulcanized mixture did not lead to the isolation of the hydroxylated fluoropolyether.

In addition to the above-indicated substances (A) to (D) and in addition to the coadjuvant, the vulcanizable compositions according to the present invention may contain carbon black, white and colored fillers, while the use of plasticizers and lubricants of the conventional type, such as stearates, arylphosphates, polyethers, polyesters, polyethylene, sulphones, sulphoxides and other known additives, which could cause the aforesaid drawbacks, is avoided.

The components of the vulcanizable compositions of the present invention may be readily incorporated into the vinylidene fluoride elastomeric copolymers, either individually or premixed.

In such manner one may attain good vulcanization rates at normal processing temperatures without encountering any risk of scorching (prevulcanization) during the preliminary processing steps which precede the actual vulcanization step.

A further advantage of the present invention resides in the complete elimination of the undesired phenomena of "reduced mold shrinkage" in the vulcanization in a closed mold and under pressure, of fluorinated elastomer articles, particularly in the case of the manufacture of O-ring gaskets.

The following examples are given merely to illustrate the present invention and are not to be construed as limitative.

EXAMPLES 1–12

In the examples reported in Tables 1 and 2, the following products were used:

Fluoroelastomer 1 = copolymer $CH_2=CF_2/C_3F_6$ in a molar ratio of 4/1, having a specific weight of 1.8 at 25° C., known as Tecnoflon NM (a trademark of Montedison S.p.A.).

Fluoroelastomer 2 = terpolymer $CH_2=CF_2/C_3F_6/C_2F_4$ in a molar ratio o 3/1/1, having a specific weight of 1.86 at 25° C. and a Mooney viscosity ML (1+4) = 120 at 100° C.

Accelerator 1 = 1-chloro-1,1-diphenyl-1-benzyl-N-diethyl-phosphoranamine.

Accelerator 2 = benzyltriphenylphosphonium chloride.

Fluoropolyether 1 of formula:

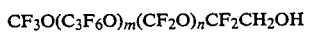

having a mean molecular weight (based on the hydroxy titer) of 600.

Fluoropolyether 2 of formula like the preceding formula, but with a mean molecular weight of 1,500.

The results of the tests reported in Tables 1 and 2 show that the compositions of this invention lead to a decrease in hardness, and to better results in the extrudability test, in the behavior to low temperature test (brittle point), and in the chemical stability test.

Examples 1, 4 and 8 are comparative tests.

TABLE 1

| Elastomeric composition: | | Example 1 | 2 | 3 | 4 |
|---|---|---|---|---|---|
| VULCANIZATION: in press at 170° C. for 10 min, in oven at 250° C. for 16 hours | | | | | |
| Elastomer 1 | p. by wt. | 100 | 100 | 100 | 100 |
| Bisphenol AF | p. by wt. | 1.6 | 1.6 | 1.6 | 1.6 |
| Accelerator 1 | p. by wt. | 0.5 | 0.5 | 0.5 | — |
| Accelerator 2 | p. by wt. | — | — | — | 0.5 |
| MgO | p. by wt. | 3 | 3 | 3 | 3 |
| Ca(OH)$_2$ | p. by wt. | 6 | 6 | 6 | 6 |
| Fluoropolyether 1 | p. by wt. | — | 2 | 5 | — |
| Fluoropolyether 2 | p. by wt. | — | — | — | — |
| Carbon Black Mt | p. by wt. | 25 | 25 | 25 | 25 |
| Extrudability Test (4) | (edge | 7 | 8 | 9 | 7 |
| Extrudability Test (4) | (surface | B | A | A | B |
| Characteristics Of The Vulcanizate | | | | | |
| Tensile strength (1) | M Pa | 13.0 | 12.0 | 10.0 | 13.5 |
| Elongation at break (1) | % | 200 | 210 | 230 | 195 |
| Shore hardness A (2) | points | 70 | 68 | 62 | 71 |
| Characteristics at low temperature: | | | | | |
| Brittle Point(3) | °C. | −14/−21 | −20/−25 | −22/−27 | −13/−21 |
| CHEMICAL STABILITY (5) | | | | | |
| Methanol, 3 days, 20° C. ΔV | % | 40 | 35 | 30 | 40 |
| Fuel C., 7 days, 70° C. ΔV | % | 18 | 17 | 12 | 17 |

(1) ASTM D 412
(2) ASTM D 2240
(3) ASTM D 746
(4) ASTM D 2230-73 Method A - System B
(5) ASTM D 471

| Elastomeric composition: | | Example 5 | 6 | 7 |
|---|---|---|---|---|
| VULCANIZATION: in press at 170° C. for 10 min, in oven at 250° C. for 16 hours | | | | |
| Elastomer 1 | p. by wt. | 100 | 100 | 100 |
| Bisphenol AF | p. by wt. | 1.6 | 1.6 | 1.6 |
| Accelerator 1 | p. by wt. | — | — | — |
| Accelerator 2 | p. by wt. | 0.5 | 0.5 | 0.5 |
| MgO | p. by wt. | 3 | 3 | 3 |
| Ca(OH)$_2$ p. by wt. | p. by wt. | 6 | 6 | 6 |
| Fluoropolyether 1 | p. by wt. | — | — | — |
| Fluoropolyether 2 | p. by wt. | 1 | 2 | 5 |
| Carbon Black Mt | p. by wt. | 25 | 25 | 25 |
| Extrudability Test (4) | (edge | 7 | 8 | 9 |
| Extrudability Test (4) | (surface | A | A | A |
| Characteristics Of The Vulcanizate | | | | |
| Tensile strength (1) | M Pa | 13.0 | 12.0 | 10.0 |
| Elongation at break (1) | % | 210 | 220 | 230 |
| Shore hardness A (2) | | 68 | 66 | 60 |
| Characteristics at low temperature: | | | | |
| Brittle Point (3) | °C. | −17/−24 | −22/−28 | −23/−29 |
| CHEMICAL STABILITY (5) | | | | |
| Methanol, 3 days, 20° C. ΔV | % | 38 | 36 | 31 |
| Fuel, C., 7 days, 70° C. ΔV | % | 16 | 15 | 11 |

(1) ASTM D 412
(2) ASTM D 2240
(3) ASTM D 395 - Method B
(4) ASTM D 573
(5) ASTM D 2230-73 Method A - System B

TABLE 2

| Elastomeric composition: | | Example 8 | 9 | 10 |
|---|---|---|---|---|
| VULCANIZATION: in press at 170° C. for 10 min, in oven at 250° C. for 16 hours | | | | |
| Elastomer 2 | p. by wt. | 100 | 100 | 100 |
| Bisphenol AF | p. by wt. | 1.5 | 1.5 | 1.3 |
| Accelerator 1 | p. by wt. | 0.6 | 0.6 | 0.6 |
| MgO | p. by wt. | 3 | 3 | 3 |
| Ca(OH)$_2$ | p. by wt. | 6 | 6 | 6 |

TABLE 2-continued

| | | | | |
|---|---|---|---|---|
| Fluoropolyether 1 | p. by wt. | — | 2 | 5 |
| Fluoropolyether 2 | p. by wt. | — | — | — |
| Carbon Black Mt | p. by wt. | 25 | 25 | 25 |
| Extrudability Test (4) | (edge) | 5 | 7 | 8 |
| Extrudability Test (4) | (surface) | B | A | A |
| Characteristics Of The Vulcanizate | | | | |
| Tensile strength (1) | M Pa | 15.0 | 13.5 | 10.0 |
| Elongation at break (1) | % | 200 | 225 | 240 |
| Shore hardness A (2) | points | 72 | 70 | 68 |
| Characteristics at low temperature: | | | | |
| Brittle Point (3) | °C. | −35/−40 | −41/−45 | −45/−50 |
| CHEMICAL STABILITY (5) | | | | |
| Methanol, 3 days, 20° C. ΔV | % | 30 | 27 | 15 |
| Fuel C., 7 days, 70° C. ΔV | % | 16 | 14 | 10 |

| | | Example | |
|---|---|---|---|
| Elastomeric composition: | | 11 | 12 |
| VULCANIZATION: in press at 170° C. for 10 min, in oven at 250° C. for 16 hours | | | |
| Elastomer 2 | p. by wt. | 100 | 100 |
| Bisphenol AF | p. by wt. | 1.3 | 1.3 |
| Accelerator 1 | p. by wt. | 0.6 | 0.6 |
| MgO | p. by wt. | 3 | 3 |
| Ca(OH)$_2$ p. by wt. | p. by wt. | 6 | 6 |
| Fluoropolyether 1 | p. by wt. | — | — |
| Fluoropolyether 2 | p. by wt. | 2 | 5 |
| Carbon Black Mt | p. by wt. | 25 | 25 |
| Extrudability Test (4) | (edge) | 7 | 8 |
| Extrudability Test (4) | (surface) | A | A |
| Characteristics Of The Vulcanizate | | | |
| Tensile strength (1) | M Pa | 14.5 | 12.0 |
| Elongation at break (1) | % | 220 | 240 |
| Shore hardness A (2) | points | 69 | 65 |
| Characteristics at low temperature: | | | |
| Brittle Point (3) | °C. | −42/−46 | −46/−50 |
| CHEMICAL STABILITY (5) | | | |
| Methanol, 3 days, 20° C. ΔV | % | 26 | 16 |
| Fuel C., 7 days, 70° C. ΔV | | 15 | 12 |

(1) ASTM D 412
(2) ASTM D 2240
(3) ASTM D 746
(4) ASTM D 2230-73 Method A - System B
(5) ASTM D 471

What is claimed is:

1. Vulcanizable compositions of fluoroelastomers based on vinylidene fluoride having improved processability and improved chemical stability, comprising, as a processing coadjuvant, a mono- or di-hydroxypolyfluoroether, the hydroxy group being present at one end of the polyether chain in the case of the mono-hydroxypolyfluoroether and the two hydroxy groups being present at the opposite ends of the polyfluoroether chain in the case of the di-hydroxypolyfluoroether, said mono- or di-hydroxypolyfluoroether having no other functional groups beside the hydroxy group at the end or ends of the polyfluoroether chain, and having a mean molecular weight ranging from 400 to 10,000 for the mono-hydroxypolyfluoroether and ranging from 2,500 to 10,000 for the di-hydroxypolyfluoroether, wherein the mono-hydroxypolyfluoroether comprises repeating fluoropolyoxylalkylene units selected from the units;

(1) $C_3F_6O$ and CFXO whre X=F or $CF_3$ and said units are statistically distributed along the fluoropolyoxyalkylene chain,
(2) $C_3F_6O$ or
(3) $CH_2CF_2CF_2O$, and wherein the di-hydroxypolyfluoroether comprises fluoropolyoxyalkylene units;
(4) $C_2F_4O$ and $CF_2O$ and said units are statistically distributed along the fluoropolyoxyalkylene chain,
(5) $C_3F_6O$, $C_2F_4O$ and CFXO where X=—F or —$CF_3$ and said units are statically distributed along the fluoropolyoxyalkylene chain,
(6) $CH_2$—$CF_2$—$CF_2$—O— and said units within the fluoropolyoxyalkylene chain are linked to one another in the following manner, —(O—CF$_2$—CF$_2$CH$_2$)$_p$—O—R$_f$—O—(CH$_2$—CF$_2$—CF$_2$—O)$_q$—, wherein R$_f$ is a fluoroalkylene group, and p and q are integers, or
(7)

and said units are linked to one another inside the fluoropolyoxyalkylene chain in the following manner

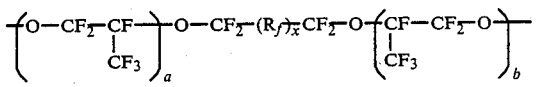

wherein R$_f$ is a fluoroalkylene group, z is 0 or 1, and a and b are integers, said mono- or di- hydroxypolyfluoroethers being used in an amount from 0.5 to 15 parts by weight per 100 parts of fluoroelastomers.

2. The vulcanizable compositions of claim 1, wherein the monohydroxypolyfluoroether having the fluoropolyoxyalkylene units (1) are selected from those having the following formula:

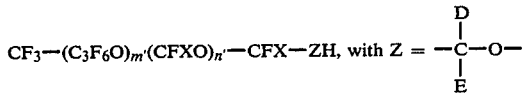

where the radicals D and E are equal to or different from each other and are selected from H, —CH$_3$ and —CF$_3$, and m' and n' are positive integers such that the m'n' ratio ranges from 1 to 20.

3. The vulcanizable compositions of claim 1, wherein the monohydroxypolyfluoroether having the fluoropolyoxyalkylene units (2) are selected from those having the following formula:

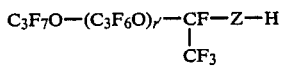

where r' is an integer and Z is the same as defined in claim 2.

4. The vulcanizable compositions of claim 1, wherein the monohydroxypolyfluoroether having the fluoropolyoxyalkylene units (3) are selected from those having the following formula:

F(CH$_2$CF$_2$CF$_2$O)$_{s'}$—CH$_2$—CF$_2$—Z—H where s' is an integer, and z is the same as defined in claim 2.

5. The vulcanizable compositions of claim 1, wherein the dihydroxypolyfluoroethers having the fluoropolyoxyalkylene units (4) are selected from those having the following formula:

HZ—CF$_2$O (C$_2$F$_4$O)$_m$(CF$_2$O)$_n$ CF$_2$—ZH where Z is the same as defined in claim 13, m and n are integers, and the m/n ratio ranges from 0.5 to 1.5, with the oxyfluoroalkylene units being statistically distributed along the claim.

6. The vulcanizable compositions of claim 1, wherein the dihydroxypolyfluoroethers having the fluoropolyoxyalkylene units in (5) are selected from the compounds having the following formula:

HZ—CF$_2$—(C$_3$F$_6$O)$_r$(C$_2$F$_4$O)$_s$(CFXO)$_t$—CF$_2$—ZH, wherein X is —F or —CF$_3$, the indexes r, s, t are integers, and Z is the same as defined in claim 2.

7. The vulcanizable compositions of claim 1, wherein the dihydroxypolyfluoroethers having the fluoropolyoxyalkylene units (6) are selected from the compounds having the formula:

HZ—CF$_2$CH$_2$(OCF$_2$CF$_2$CF$_2$)$_p$—OR$_f$—O—(CH$_2$CF$_2$CF$_2$O)$_q$CH$_2$CF$_2$—ZH where R$_f$ is a fluoroalkylene group and Z is the same as defined in claim 13, and p and q are integers.

8. The vulcanizable compositions of claim 1, wherein the dihydroxypolyfluoroethers having the fluoropolyoxyalkylene units in (7) are selected from the compounds having the formula:

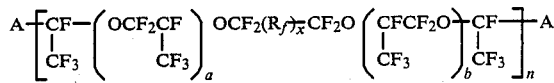

where A is a group comprising the end group —OH, n is an integer equal to or higher than 1 and a and b are integers.

9. The vulcanizable compositions of claim 1, wherein the fluoroelastomer is a copolymer of vinylidene fluoride, perfluoropropene or a blend of both with tetrafluoroethylene.

10. The vulcanizable compositions of claim 1, comprising polyfluoroethers not containing functional groups, corresponding to the mono- and di-hydroxypolyfluoroethers, as indicated in claim 1, in an amount ranging from 0.5 to 4 parts by weight per 100 parts of fluoroelastomer.

* * * * *